US006985643B1

(12) United States Patent
Fåhraeus et al.

(10) Patent No.: US 6,985,643 B1
(45) Date of Patent: Jan. 10, 2006

(54) DEVICE AND METHOD FOR RECORDING HAND-WRITTEN INFORMATION

(75) Inventors: Christer Fåhraeus, Lund (SE); Ola Hugosson, Lund (SE); Petter Ericson, Malmö (SE)

(73) Assignee: Anoto Group AB, Lund (SE)

( * ) Notice: Subject to any disclaimer, the term of this patent is extended or adjusted under 35 U.S.C. 154(b) by 0 days.

(21) Appl. No.: 09/673,702

(22) PCT Filed: Apr. 30, 1999

(86) PCT No.: PCT/SE99/00717

§ 371 (c)(1),
(2), (4) Date: Oct. 19, 2000

(87) PCT Pub. No.: WO99/60467

PCT Pub. Date: Nov. 25, 1999

Related U.S. Application Data

(60) Provisional application No. 60/091,323, filed on Jun. 30, 1998.

(30) Foreign Application Priority Data

Apr. 30, 1998 (SE) .................................... 9801535

(51) Int. Cl.
G06K 9/22 (2006.01)
G06K 9/20 (2006.01)
G06K 9/18 (2006.01)
(52) U.S. Cl. ........................ 382/313; 382/324; 382/186
(58) Field of Classification Search ................ 382/314, 382/312, 313, 321, 324, 181, 182, 185, 186, 382/187, 284, 294; 358/473
See application file for complete search history.

(56) References Cited

U.S. PATENT DOCUMENTS

| 5,051,736 | A | * | 9/1991  | Bennett et al.  | 345/180  |
|-----------|---|---|---------|-----------------|----------|
| 5,581,637 | A |   | 12/1996 | Cass et al.     | 382/284  |
| 5,748,808 | A | * | 5/1998  | Taguchi et al.  | 382/312  |
| 5,850,058 | A | * | 12/1998 | Tano et al.     | 178/18.01|
| 6,044,165 | A | * | 3/2000  | Perona et al.   | 382/103  |
| 6,151,015 | A |   | 11/2000 | Badyal et al.   | 345/179  |

FOREIGN PATENT DOCUMENTS

| EP | 0112415 A1 | 7/1984  |
|----|------------|---------|
| EP | 0692759 A2 | 1/1996  |
| WO | WO8500683  | 2/1985  |
| WO | WO9737320  | 10/1997 |

OTHER PUBLICATIONS

Christer Fåhraeus, Ola Hugosson, and Petter Ericson, U.S. Appl. No. 09/024,641, filed Feb. 17, 1998.

(Continued)

Primary Examiner—Wenpeng Chen
(74) Attorney, Agent, or Firm—Birch, Stewart, Kolasch & Birch, LLP

(57) ABSTRACT

A device for recording hand-written information in the form of characters, symbols, graphs, drawings, calligraphy and similar hand-written information defined by a hand movement, comprises recording means (3) which are adapted to be moved by a hand which carries out the hand movement and to record a plurality of images with partially overlapping contents while the recording means are being moved. The device further comprises image-processing means (4) which are adapted to determine the relative position of the images with the aid of the partially overlapping contents for providing a description in digital format of how the unit has been moved and, in this way, a digital representation of the hand-written representation. A method of recording hand-written information is also disclosed.

46 Claims, 5 Drawing Sheets

OTHER PUBLICATIONS

Abstract of Japanese Patent Publication No. 3-265023, Delphion Intellectual Property Network, 1991, and corresponding Japanese Patent Publication No. 3-265023, published Nov. 26, 1991.

* cited by examiner

FIG.7a
FIG.7b
FIG.7c
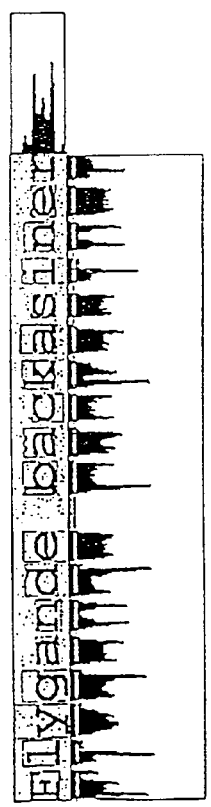
FIG.7d
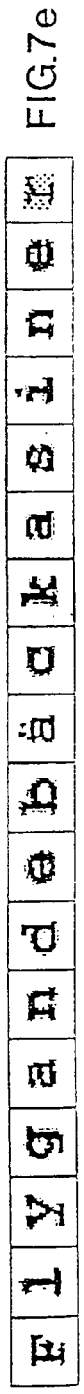
FIG.7e

DEVICE AND METHOD FOR RECORDING HAND-WRITTEN INFORMATION

This application claims the benefit of Provisional Application No. 60/091,123, filed Jun. 30, 1998.

FIELD OF THE INVENTION

The present invention relates to a device for recording hand-written in the form of characters, symbols, graphs, calligraphy and similar hand-written information defined by a hand movement, comprising recording means which are adapted to be moved by a hand which carries out the hand movement and which is adapted to record a plurality of images with partially overlapping contents while the recording means are being moved. The invention also relates to a method for recording hand-written information.

BACKGROUND OF THE INVENTION

Today, practically all information processing takes place in computers. The information processed often consists of text which is input to the computer by the intermediary of a keyboard. If the text which is to be input has already been written on a sheet of paper, a scanner is sometimes used for the inputting.

Sometimes there is a need for inputting hand-written or other hand-generated information to a computer. An example of this is when one wishes to input a person's signature. Presently, this can be carried out by scanning the signature or by the person writing his signature with the aid of a mouse in a drawing program.

Certain smaller computers, so-called pocket computers, have an interface enabling inputting of hand-written text with the aid of a pen. More specifically, such computers have a touch-sensitive screen, upon which the user writes with a pen. The computer records the movement of the pen across the screen. ICR software (ICR=Intelligent Character Recognition) identifies the characters represented by the recorded movement and stores them in character-coded format in the computer. A drawback of this technique is that it requires access to a touch-sensitive screen.

Moreover, by way of JP 03265023, it is known to input hand-written text to a computer with the aid of a pen whose tip is provided with a ball. When one "writes" with the pen on a substrate, the ball rolls. With the aid of information about how much and in which direction the ball is moving, the computer can determine how the pen is being moved. A drawback of this device and other devices based on moving mechanical components is that the moving component makes the device more difficult to manufacture and less durable.

Furthermore, EP 0 629 759 discloses a device for storing hand-written text in the form of an image. This device has no moving parts. It comprises a pen tip and a CCD area sensor which is used to reproduce that written with the pen tip. In one embodiment, the device has the pen tip at a first end and the CCD sensor at a second end. In this case, the user first writes with the pen tip and then turns the device and activates the CCD sensor to reproduce what has already been written. In another embodiment, the pen tip and the CCD sensor are located at the same end of the device. In this case, the CCD sensor continuously reproduces what is being written by recording images. The images which have partially overlapping contents are put together to a composite image of what has been written. When the written information is to be shown, the composite image is shown.

SUMMARY OF THE INVENTION

An object of the present invention is to provide an alternative method and an alternative device for recording hand-written information in the form of characters, symbols, graphs, calligraphy and similar hand-written information defined by a hand movement.

This object is achieved by a device according to claim 1 and a method according to claim 18. Preferred embodiments are stated in the subclaims.

Thus, according to a first aspect, the invention relates to a device for recording hand-written information in the form of characters, symbols, graphs, drawings, calligraphy and similar hand-written information defined by a hand movement. The device comprises recording means adapted to be moved by a hand which carries out the hand movement and to record a plurality of images with partially overlapping contents while the recording means are being moved. The device further comprises image-processing means which are adapted to determine the relative position of the images with the aid of the partially overlapping contents for providing a description in digital format of how the recording means have been moved and, in this way, a digital representation of the hand-written information.

Accordingly, the device is based on the idea of using images. However, the images are not used like in prior art to reproduce the hand-written information but are instead used to determine how the recording means are moved when a user performs the hand movement, e.g. "writes" or "draws" something. The device thus need not store images of the hand-written information but it is sufficient to store information about the movement. This also means that hand-written information can be input to the computer without any information simultaneously being "written" with ink or some colorant from a pen tip on a writing surface. The information can be written directly in the air if only the recording means are directed at a surface which gives the images contents making it possible to determine how the images overlap. It goes without saying that the device can also be provided with a pen tip, and "colorant-based" writing can occur simultaneously with the electronic recording. In this case, however, the colorant-based writing need not occur within the field of vision of the recording means. When the hand-written information is to be shown after recording, this is carried out on the basis of the stored description of how the recording means have been moved.

Thus, the device carries out a digitisation of the hand movement so that a computer can process the information represented by the hand movement. In this context, it should be pointed out that the movement of the recording means is represented by the projection of the end of the recording means upon the surface at which the recording means is directed.

The image-processing means are preferably implemented with the aid of a suitably programmed processor. It can also be implemented entirely in hardware or in some combination of hardware and software.

In an advantageous embodiment, the device is adapted to store said description in digital format. It may then, for instance, show the recorded hand-written information by means of the description. Alternatively, the description can be forwarded to, for instance, a personal computer where showing can occur.

A major advantage of the device is that the image recording function can be used for other purposes as well, thus making it possible to provide a device with several different fields of application. For example, the image recording function can be used for inputting text and images which are already defined on some form of information carrier by imaging the text and/or the images with the aid of the sensor. This gives the user access to a completely new tool enabling him to work more efficiently. With this single tool, the user can thus record text and image information from different sources and supplement it with hand-written information. In this way, the device can become an important tool for students, office staff, and other individuals whose work involves information processing.

Suitably, the description comprises a plurality of movement vectors each indicating how the unit has been moved between the recording of two images. The movement vectors can be described with the aid of the coordinates of a certain point in the first image and the coordinates of the same point in the second image expressed in some suitable coordinate system. The movement vectors constitute a memory-saving way of storing the description of how the recording unit has been moved.

In some applications it may be advantageous for the computer to know how the recording unit has been moved during the hand movement. This may, for example, be the case if one wishes to input calligraphy or other information corresponding to lines which are not of uniform thickness. For this purpose, the description may include turning indications, each indicating how the recording unit has been turned between the recording of two images.

Furthermore, in one embodiment, the device is adapted to determine the speed at which the recording unit has been moved between the recording of two images. In this embodiment, the device can thus determine the speed in different parts of the path of movement defined by the hand movement. This may be interesting if, for example, one wishes to check the authenticity of a signature, for which purpose the device may further be adapted to compare the speed thus determined with pre-recorded speed data in order to check that the signatory really is the same person who signed the earlier signature, from which the recorded speed data was obtained.

As mentioned by way of introduction, the information one wishes to process in a computer often consists of text, i.e. various types of characters. For this reason, the device is advantageously adapted to identify the characters with the aid of the description in digital format of how the recording unit has been moved and to store them in character-coded format. ICR software is advantageously used for this purpose. An advantage of storing the inputted information in character-coded format in the device is that this requires less memory space.

Advantageously, the device has a light-sensitive sensor means with a two-dimensional sensor surface for recording the images. In this context, a two-dimensional sensor surface refers to the fact that the sensor surface must be able to image a surface with a matrix of pixels so that images with overlapping contents can be recorded. A CCD sensor and a CMOS sensor are examples of suitable sensors.

The determination of the relative position of the images should be carried out both horizontally and vertically in order to enable the inputting of hand-written information defined by arbitrary hand movements.

While the recording unit is being moved, it is directed at a surface which is imaged with the aid of the images. The unit can be passed over the surface in contact with the same, in which case the hand movement is carried out in the same way as if one were writing or drawing on the surface with a pen. As an alternative, it can be held at a distance from the surface, which is thus not required to be an even surface but rather can have any kind of topography, in which case the hand movement is carried out in the same way as if one were writing or drawing in the air. The purpose in both cases is that the recording unit shall continuously record images of what is located within its field of vision along its path of movement.

In order to make it easier for the user to "see" what he is writing or drawing by means of the recording unit, the device preferably comprises tracing means for indicating on the surface how the unit is being moved. The tracing means can, of course, comprise a pen function, but, preferably, they should leave no permanent marks on the substrate at which they are directed. For example, they can comprise an illumination means adapted to project light upon the surface.

In a preferred embodiment, the recording means and the image-processing means are arranged in a common casing, which is adapted to be moved by the hand making the hand movement. It then becomes a tool which is easy for the user to carry along and which, consequently, is easy to use in all types of situations. Of course, the recorded, hand-written information is forwarded from the device to, for instance, a stationary computer.

In an alternative embodiment, the recording means can be arranged in a first casing and the image-processing means in a second casing, such as a stationary computer, to which the recording means are connected.

The advantage of the first-mentioned alternative is the fact that smaller amounts of data need be transferred from the device to the computer.

In addition, in a particularly preferred embodiment, the device is adjustable to an operational mode in which it is adapted to record predefined information, especially text, which is located on an information carrier by imaging the information with the aid of a plurality of images with partially overlapping contents. In this embodiment, the capability of the device to record images is utilised in two ways, something which a user obviously finds attractive since he is not obliged to use two different tools with different technical solutions for these functions.

Moreover, the device is advantageously adjustable to a further operational mode in which it is adapted to image an object located at a distance from the device. In this operational mode, the device thus has the function of a camera. This operational mode may require the device to be equipped with an adjustable lens system which permits sharp imaging also at longer distances.

In addition, the device can advantageously be provided with a transceiver for wireless communication with an external unit. In this way, information can be transferred between the device and, for example, an external computer. The transceiver can be an IR transceiver, a mobile radio transceiver, or some other suitable transceiver.

According to a second aspect of the invention, it relates to a method for recording hand-written information in the form of characters, symbols, graphs, drawings, calligraphy and similar hand-written information defined by a hand movement, comprising the steps of moving a device with a hand which carries out the hand movement; recording a plurality of images with overlapping contents while the device is being moved; and determining the relative position of the images with the aid of the partially overlapping contents for providing a description in digital format of how the device has been moved and, in this way, a digital representation of the handwritten information. The method has the same advantages as those described above with respect to the device.

According to a third aspect of the invention, it relates to a method for determining the position of a device which is adapted to record a plurality of images while being moved, the images being recorded with partially overlapping contents which are used to determine the position of the device. This aspect of the invention can, for example, be used for solving the problems associated with determining the position of three-dimensional mice. A three-dimensional mouse is a control device with at least six degrees of freedom. Presently, accelerometers are used for determining how the three-dimensional mouse is moved. The drawback of these accelerometers is that they are only capable of determining relative positions. Consequently, they are unable to determine when the control device has been moved in such a way that it has returned to its original position. If, instead, a three-dimensional mouse is equipped with one or more devices with the above-described structure, each device can be used for determining the translational position along and the rotational position about an axis by recording images with partially overlapping contents. By comparing each image with the image in the original position, it can be determined when the device returns to the original position. Moreover, by determining the relative position of the images and with knowledge of the image recording frequency, it is possible to determine the speed of the movement, the distance and the direction of the movement, and thus the current position.

BRIEF DESCRIPTION OF THE DRAWINGS

The present invention will now be described by way of an example showing how the invention can be implemented, with reference to the accompanying drawings, in which FIG. 1 schematically shows an embodiment of a device according to the invention;

FIGS. 7a–7e schematically show how text is recorded in the scanner mode.

DESCRIPTION OF A PREFERRED EMBODIMENT

Figure 1:
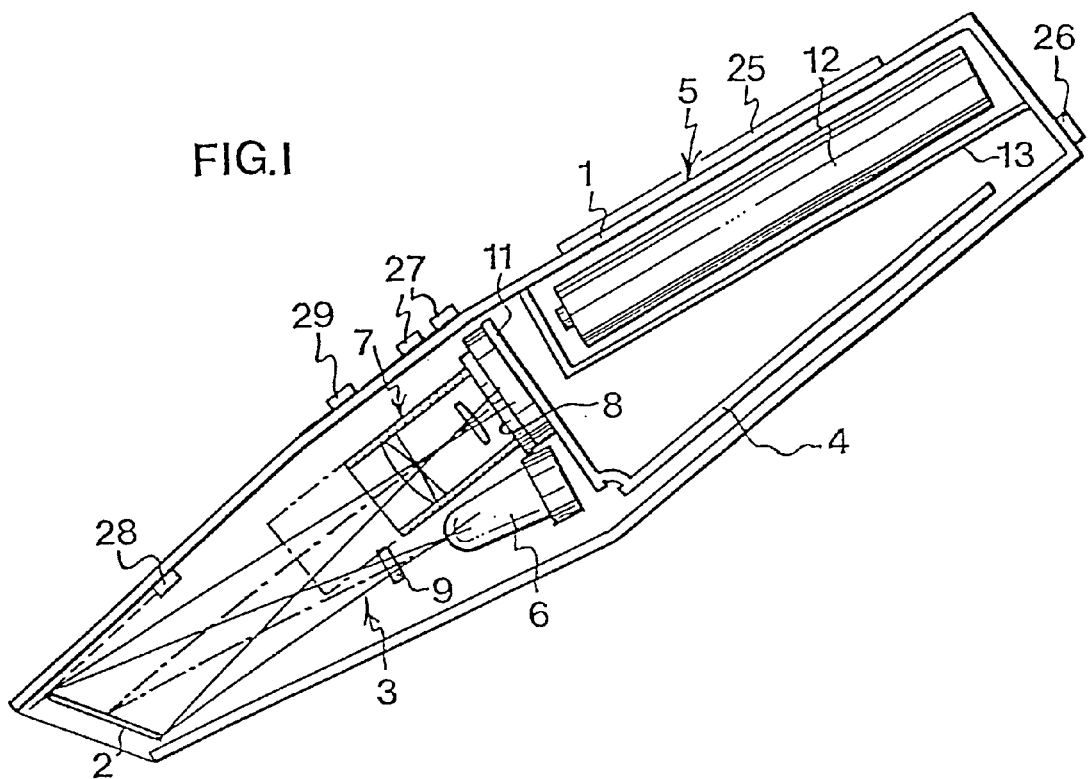

In the embodiment of the device according to the invention shown in FIG. 1, it comprises a casing 1 having approximately the same shape as a conventional highlighter pen. One short side of the casing has a window 2, which is intended to abut against or be held at a distance from a surface when information is to be input to a computer with the aid of the device. The window 2 is somewhat recessed in the casing in order not to wear against the paper.

The casing 1 essentially contains an optics part 3, an electronic circuitry part 4, into which information is fed, and a power supply 5.

The optics part 3 is used for a recording images and thus is an example of how the recording means can be implemented. It comprises a light-emitting diode (LED) 6, a lens system 7, and a light-sensitive sensor 8, which constitutes the interface with the electronic circuitry part 4.

The task of the LED 6 is to illuminate a surface which is currently located under the window. A diffuser 9 is mounted in front of the LED 6 for diffusing the light.

The lens system 7 has the task of projecting an image of the surface located under the window 2 on the light-sensitive sensor 8 as accurately as possible. If the sensor 8 has a smaller light-sensitive area than the window 2, the lens system 7 is also required to reduce the image.

In this example, the light-sensitive sensor 8 comprises a two-dimensional, square CCD unit (CCD=charge coupled device) with a built-in A/D converter. Such sensors are commercially available. The sensor 8 is mounted at a small angle to the window 2 and on its own printed circuit board 11.

The power supply to the device is obtained from a battery 12, which is mounted in a separate compartment 13 in the casing.

Figure 2:
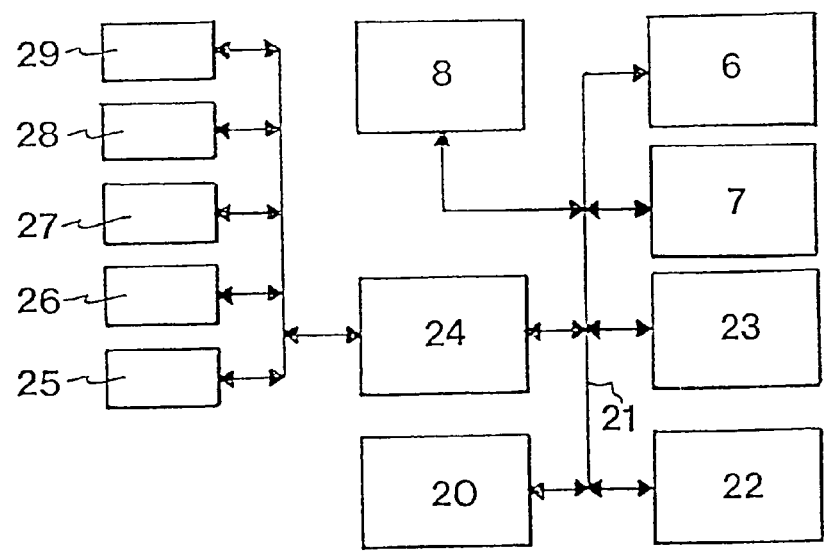
FIG. 2 is a block diagram of the electronic circuitry in an embodiment of a device according to the invention.

The block diagram in FIG. 2 schematically shows the electronic circuitry part 4. This is used, among other things, for processing the recorded images and thus is an example of how the image-processing means can be implemented. It comprises a processor 20, which by the intermediary of a bus 21 is connected to a ROM 22, in which the programs of the processor are stored, to a read/write memory 23, which constitutes the working memory of the processor and in which the images from the sensor as well as identified and interpreted characters are stored, to a control logic unit 24, as well as to the sensor 8 and the LED 6. The control logic unit 24 is in turn connected to a number of peripheral units, comprising a display 25, which is mounted in the casing, an IR transceiver 26 for transferring information to/from an external computer, buttons 27, by means of which the user can control the device and specifically adjust the device between a first mode in which hand-written information is to be input, a second mode in which the device operates as a scanner, and a third mode in which the device operates as a camera, a tracer LED 28 which emits a light beam, making it easier for the user to know which information he is inputting, as well as an indicating device 29, e.g. an LED, indicating when the pen is ready to record information. Control signals to the memories, the sensor, and the peripheral units are generated in the control logic unit 24. The control logic also handles generation and prioritisation of interrupts to the processor. The buttons 27, the IR transceiver 26, the display 25 and the tracer LED 28, and the LED 6 are accessed by the processor writing and reading in a register in the control logic unit. The buttons 27 generate interrupts to the processor 20 when they are activated.

The operation of the device will now be described, presupposing that the user first wishes to input handwritten text. The user directs the device at a surface having some kind of pattern. For example, the surface can be a sheet of paper with text on it, a wall, or a bowl of sweets. He presses a button 27 to activate the device and subsequently "writes" the text he wishes to input with the device directed at the selected surface. The tracer LED 28 successively indicates the path of movement on the surface by means of a luminous spot to give the user an idea of the movement. When the user activates the pen, the processor 20 commands the LED 6 to begin generating strobe pulses at a predetermined frequency, suitably about 25 Hz, whereupon the images recorded by the sensor are stored in the read/write memory 23. When the user has written the information he wishes to input, he releases the button 27, whereupon the processor 20 turns off the LED 6. The user can then control the device to show the inputted information on the display 25 or to transfer it to an external computer by the intermediary of the IR transceiver 26. The possibility of showing the scanned information directly on the display has proven very important since a user often wishes to verify that the correct information has been scanned.

Figure 3:
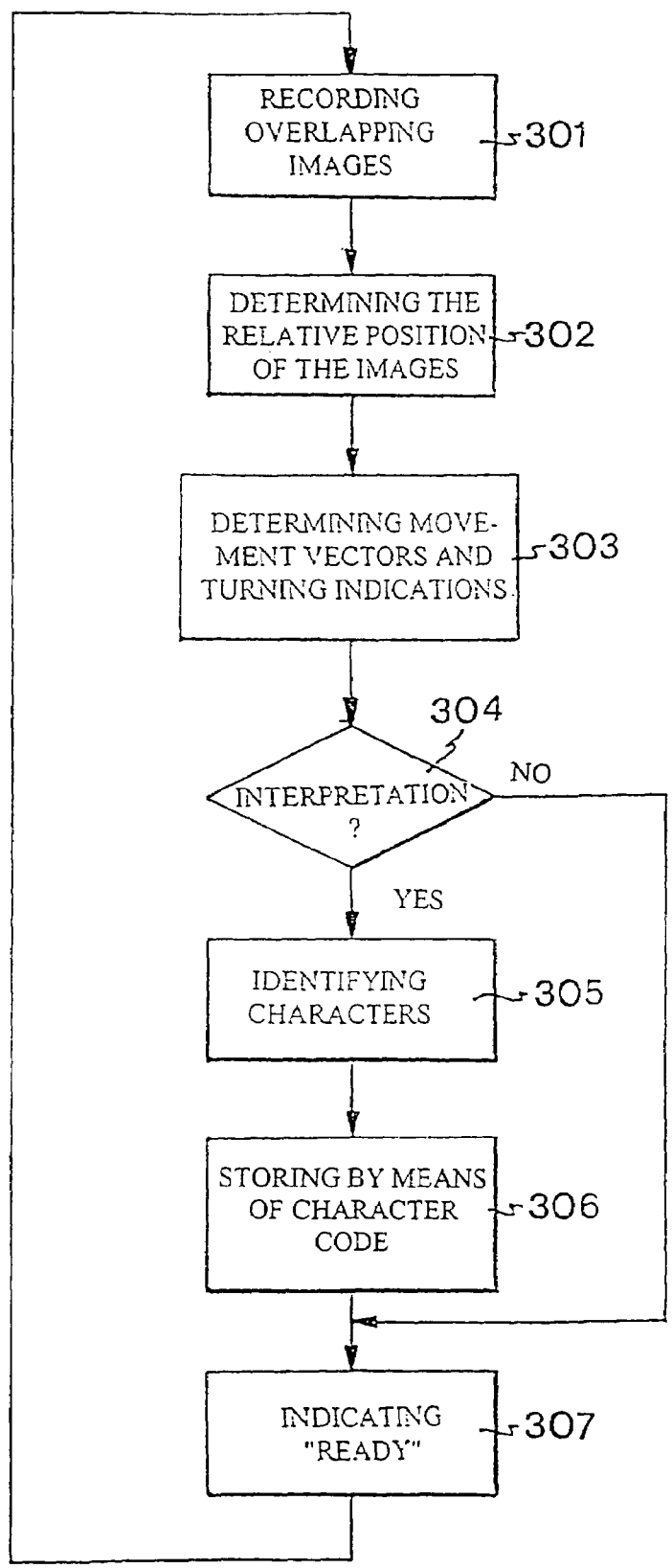
FIG. 3 is a flowchart showing the functioning of the device.

The flowchart in FIG. 3 shows in more detail how the device functions in connection with the inputting of handwritten information. In step 301, images with overlapping contents are scanned while the device is being moved relative to the surface at which it is directed. The scanned images are stored in the read/write memory 23. The images are stored as images, i.e. with the aid of a plurality of pixels, each having a grey scale value in a range from white to black.

As soon as an image has been recorded, the process begins of determining how the current image and the previous image overlap, step 302, i.e. in which relative position the best match is obtained between the contents of the images. For this purpose, every possible overlap position between the images is examined, at the pixel level, and an overlap measurement is determined as follows:

1) For each overlapping pixel position, the grey scale values of the two relevant pixels are added up if the latter are not white. Such a pixel position in which none of the pixels are white is designated a plus position.

2) The grey scale sums for all the plus positions are added up.

3) The neighbours of each pixel position are examined. If an overlapping pixel position is not a neighbour of a plus position and consists of a pixel which is white and a pixel position which is not white, the grey scale value of the non-white pixel is subtracted, possibly multiplied by a constant, from the sum in point 2).

4) The overlap position providing the highest overlap measurement as stated above is selected. In the resulting composite image the mean value of the grey scale value of the overlapping pixels is used. In this way, noise can be suppressed in the overlap area. The putting-together is thus carried out both vertically and horizontally. If it is detected that, when being put together, the images do not end up on a horizontal line, the composite image is suitably adjusted so that it becomes horizontal, for example by turning the composite image.

Our Swedish Patent Application No. 9704924-1 and the corresponding U.S. Pat. No. 6,563,951, describe an alternative way of matching the images in order to find the best overlap position. The content of these applications is herewith incorporated by reference.

When the relative position of the two images has been determined, the processor 20 determines a movement vector, in step 303, which indicates how far and in which direction the device has been moved between the recording of the images. The movement vector is stored in the memory as part of a digital description of how the device has been moved. The processor also determines how the second image is turned in relation to the first one, i.e. how the device has been turned between the recording of the images. This is carried out by examining the overlap in different turning positions between the first and the second image. The turning is stored as a turning indication in the memory and it, too, constitutes a part of the description of how the device has been moved. When this step has been completed, the first image is discarded and the second image becomes the first image, after which the putting-together of the subsequent scanned image with this new first image is commenced. It should be pointed out that in most cases, movement vectors and turning indications need not be determined in a separate step but they can be obtained as a direct result of the determination of the relative position of the images.

As is evident from that described above, steps 301–303 can proceed more or less in parallel.

When the device detects that the inputting of an information unit is complete, for instance by the user releasing the button 27 or by the device not being moved for at least a predetermined period of time, the device decides whether or not the inputted information is to be interpreted, step 304. If the user has indicated by pressing a button that the inputted information is text information which is to be interpreted, the processor 20 reads in the movement vectors in the description of the information unit in question to an ICR module which identifies which character the movement vectors represent. Subsequently, the identified character is stored in character-coded format in the memory. The interpreted character can be shown on the display 25 if the user indicates this preference by pressing a button. If the user has not indicated that the information is to be interpreted, no further action is taken with respect to the information unit and the device is ready to record further information units.

Figure 4:
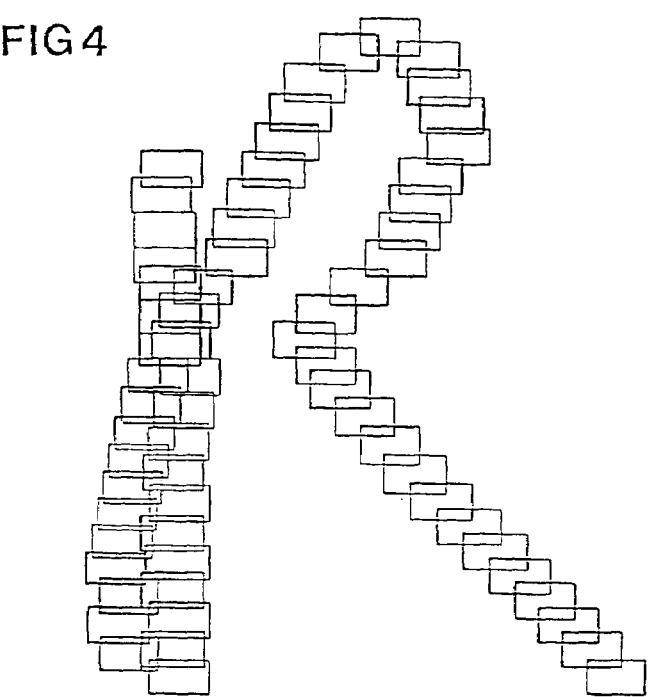
FIG. 4 is a schematic illustration showing how a surface is imaged in connection with the inputting of hand-written information.

FIG. 4 schematically shows how images with overlapping contents are recorded when a device as described above is directed at a sheet of paper and the device is moved in a path of movement forming the letter "R". For the sake of simplicity, the contents of the images are not shown in FIG. 4.

Figure 5:
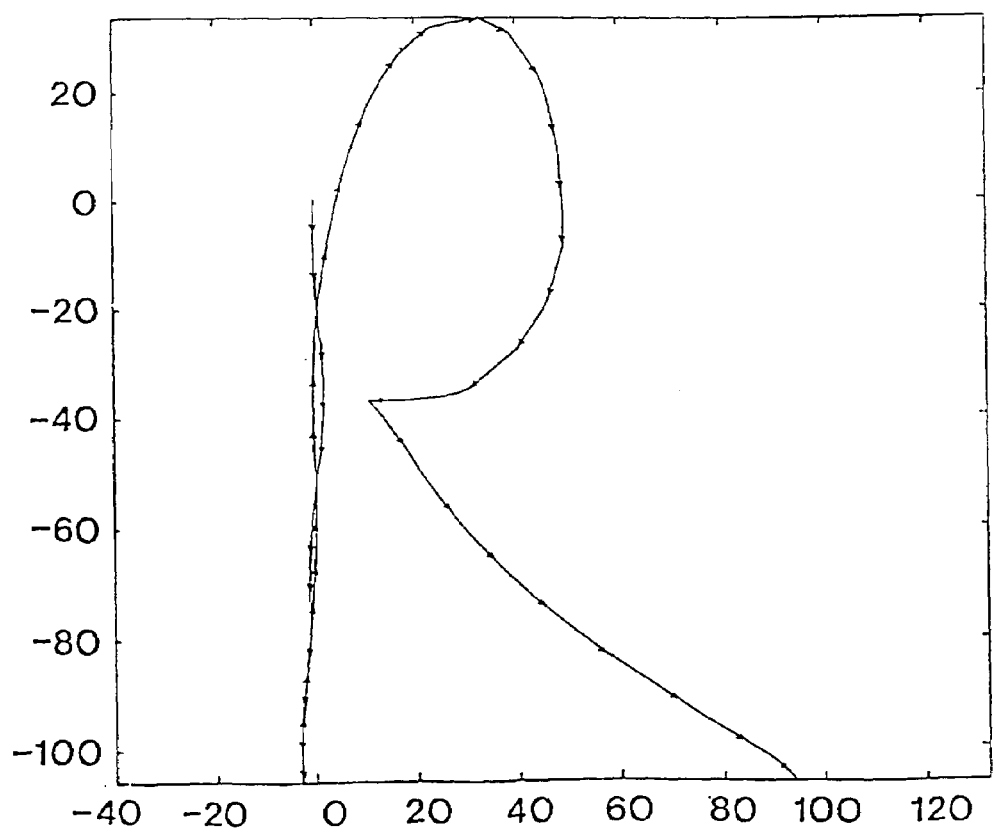
FIG. 5 illustrates how the inputted information can be shown on a display.

FIG. 5 shows how an inputted letter R can be reproduced on the display of the device on the basis of the relative positions determined by the device for the images in FIG. 4. Thus, in this case, the device shows an "image" of the inputted character with the aid of the movement vectors, not an interpreted character.

The above description outlines how the device can be used in a first mode for inputting hand-generated information. However, in a second mode, the device can also be used as a scanner, i.e. for scanning predefined text and image information on an information carrier. If the user wishes to use the device in this way, he indicates this by pressing a button in a suitable manner.

Suppose now that the user wishes to scan text from a sheet of paper. In this case, the user directs the device at the sheet of paper with the text at the location where he wishes to begin recording a character sequence. He presses the button 27 to activate the pen and passes it over the text which is to be recorded, following the text in the same manner as when one reads the text. The tracer LED 28 emits a light beam which makes it easier to follow the lines. When the user activates the pen, the processor 20 controls the LED 6 to scan images in the same way as described above with respect to inputting of hand-generated information. When the user has passed the device over the selected text or has come to the end of a character line, he lifts the pen off the sheet of paper and releases the activating button, whereupon the processor 20 turns off the LED 6.

Figure 6:
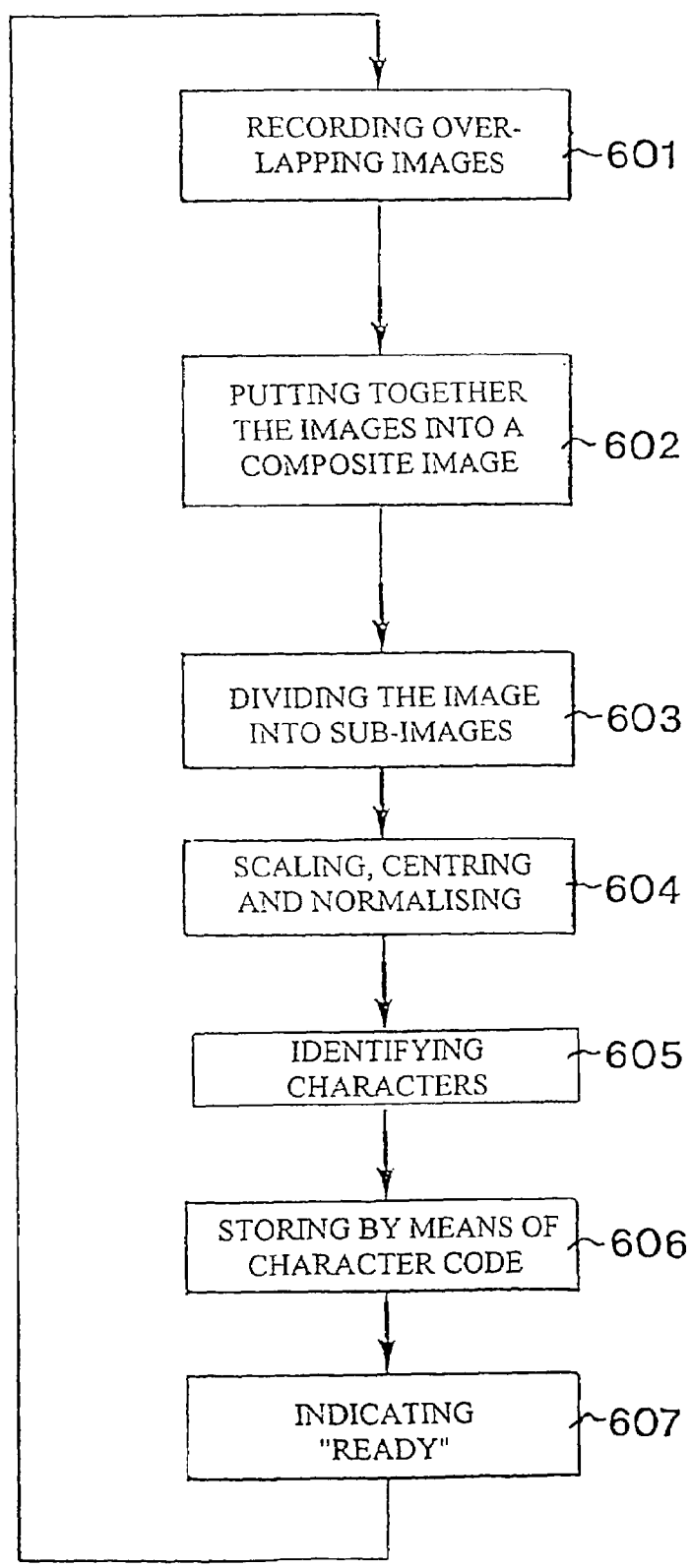
FIG. 6 is a flowchart illustrating how the device is used in a scanner mode.

The flowchart in FIG. 6 illustrates in more detail how the device operates in this mode. In step 601, the images with overlapping contents are scanned and stored in the same way as in the first mode.

In step 602, the best overlap position is determined for each pair of images in the same way as described above for the first mode. In this position, the images are put together into a composite image comprising a plurality of characters, possibly a whole line.

In step 603, the software of the processor 20 divides the composite image into sub-images, each comprising only one character. The purpose of this is to create input signals to the OCR software which is to interpret the characters. The division is effected by adding up the grey scale values of the pixels for each pixel row and each pixel column in the composite image. By studying the local intensity minima for the row sums and column sums thus obtained, boundaries can be determined for the extent of each character in the image.

In step 604, each of the sub-images is scaled down to a predetermined pixel format by dividing the sub-image into groups of pixels, each of which is replaced by a pixel whose grey scale value corresponds to the mean value of the grey scale values of the pixels included in the group. If necessary, a like downscaling can be carried out between other steps of the method according to the invention. Further, the character is centred with respect to its point of balance and the grey scale values are normalised so that the sum of the square of the grey scale value of each pixel is given a fixed value.

Subsequently, in step 605, each character in the composite image of the character sequence recorded is interpreted. The grey scale values of the pixels which together constitute a sub-image containing only one character are fed as input signals to an OCR software. In step 606, the identified character is stored using a predetermined character code format, for example ASCII code, in the read/write memory 23 in a memory area for interpreted characters. When the character identification and storing in character-coded format is completed, the processor activates the indicating device 29 to inform the user that it is ready to record a new character sequence, step 607. Subsequently, it goes back to step 601.

The above steps in both the first and the second mode are thus carried out by the processor 20 with the aid of the associated units and suitable software. Such software can be created by the skilled person with the aid of the above instructions if it is not commercially available.

FIGS. 7a–7e illustrate how the character sequence "Flygande bäckasiner" is scanned. FIG. 7a shows the text on a sheet of paper, which also has a certain amount of "dot noise" in the form of small black spots. FIG. 7b shows the images which are being recorded with the aid of the sensor. As can be seen from this figure, the contents of the images partially overlap. For example, the letter l appears completely in image No. 1 and partially in image No. 2. The degree of overlapping depends on the traction speed, i.e. the speed with which the user pulls the device over the text in relation to the frequency with which the contents of the sensor are read out. FIG. 7c shows what the whole composite image looks like. It should be noted that the image is still stored in the form of pixels. FIG. 7d illustrates the division of the composite image into sub-images. FIG. 7e shows the scaled and normalised letters which are used as input signals to the neural network. When the method has been carried out; the text "Flygande bäckasiner" is stored in the read/write memory of the device as ASCII code.

As stated above, the device can also be used in a third mode, the camera mode, for recording images of objects which are located at a distance from the device. In order to effect sharp imaging at various distances, the lens system 7 can be adjustable between two fixed positions, one being used in the scanner mode and the other in the camera mode. Alternatively, the position of the lens system 7 can be slidably adjustable for providing an autofocus function. The adjustment of the lens system can be effected by means of the same technique as is used in cameras.

What is claimed is:

1. A method of recording handwritten information defined by a hand movement, said method comprising:
providing a surface having a preexisting pattern;
providing an imaging device;
moving the imaging device with a hand which is carrying out the hand movement relative to the surface while recording with the imaging device a plurality of images of the preexisting pattern with partially overlapping contents;
comparing said images in pairs to determine, with the aid of the partially overlapping contents, a relative shift of the preexisting pattern between each pair of images; and
providing a description in digital format of how the imaging device has been moved over the surface based at least in part on the thus-determined relative shifts.

2. A method according to claim 1, wherein the handwritten information comprises characters and further comprising identifying the characters with the aid of the description and storing them in character-coded digital format.

3. A method according to claim 1, further comprising displaying the handwritten information based on said description.

4. A method according to claim 1, further comprising determining, on the basis of the partially overlapping contents of the images, the speed at which the device has been moved between recording of two images.

5. A method according to claim 4, further comprising comparing the speed with pre-recorded speed data for checking the authenticity of the handwritten information.

6. A method according to claim 1, further comprising indicating on the surface the movement of the device.

7. A method according to claim 1, further comprising recording pre-existing information on an information carrier by imaging the pre-existing information with the aid of a plurality of images with partially overlapping contents.

8. A method according to claim 7, further comprising adjusting the device from a first operational mode for recording the handwritten information to a second operational mode for recording the pre-existing information.

9. The method according to claim 1, further comprising storing the handwritten information by storing said description.

10. The method according to claim 1, wherein said comparing the images in pairs is performed in parallel with said providing a description in digital format.

11. A method according to claim 1, wherein the imaging device comprises a light-sensitive sensor with a two-dimensional sensor surface for recording the images, and a light source, further comprising selectively activating the light source to illuminate said surface while controlling said light-sensitive sensor to capture images of the thus-illuminated surface.

12. A method according to claim 11, further comprising selectively activating the light source to strobe at a predetermined frequency.

13. A method according to claim 1, further comprising selectively operating a transceiver to transfer said description to an external device.

14. A method according to claim 13, wherein the transceiver communicates wirelessly with the external device.

15. A method according to claim 1, further comprising operating a pen tip connected to the imaging device to generate permanent marks on said surface, said marks being undetectable to said imaging device.

16. A method according to claim 1, further comprising operating a pen tip connected to the imaging device to generate permanent marks on said surface, such that said marks are excluded from said images.

17. A method according to claim 1, wherein said preexisting pattern includes graphics printed on the surface.

18. A method according to claim 1, wherein said comparing said images in pairs comprises evaluating every possible candidate shift between said pair of images.

19. A method according to claim 1, wherein said comparing said images in pairs comprises evaluating, based on a plurality of element values for each image, different candidate shifts between said pair of images by:
   applying said candidate shifts to one image with respect to the other image in said pair of images;
   effecting, for each candidate shift, a comparison of each element value of said one image and an overlapping element value of said other image; and
   when the comparison fulfills a predetermined criterion, selectively updating a match rate value for the candidate shift.

20. A method according to claim 19, wherein said comparing said images in pairs further comprises determining said relative shift as the candidate shift that has an optimum match rate value.

21. A device for recording handwritten information defined by a hand movement, comprising:
   an imaging device configured to be moved by a hand which carries out the hand movement and to record a plurality of images with partially overlapping contents of a surface having a preexisting pattern while the imaging device is being moved; and
   an image processor configured to compare said images in pairs to determine, with the aid of the partially overlapping contents, a relative shift of the preexisting pattern between each pair of images and to provide a description in digital format of how the imaging device has been moved over the surface based at least partially on the thus-determined relative shifts.

22. A device according to claim 21, wherein said description comprises a plurality of movement vectors each indicating how the imaging device has been moved between said pair of images.

23. A device according to claim 21, wherein said description comprises turning indications, each indicating how the imaging device has been turned between said pair of images.

24. A device according to claim 21, wherein said device is configured to determine, on the basis of the partially overlapping contents of the images, the speed at which the imaging device has been moved between said pair of images.

25. A device according to claim 24, wherein said device is configured to compare the speed with pre-recorded speed data for checking the authenticity of the inputted information.

26. A device according to claim 21, wherein the handwritten information comprises characters and wherein the image processor is further configured to identify the characters with the aid of said description and to store the identified characters in character-coded format.

27. A device according to claim 21, wherein said image processor is configured to determine the relative shift both horizontally and vertically.

28. A device according to claim 21, further comprising a tracer for indicating on the surface the movement of the imaging device.

29. A device according to claim 28, wherein the tracer comprises an illuminator which projects light onto the surface.

30. A device according to claim 21, wherein the imaging device and the image processor are arranged in a common casing which is configured to be moved by the hand carrying out the hand movement.

31. A device according to claim 21, wherein the imaging device is arranged in a first casing and the image processor in a second casing.

32. A device according to claim 21, wherein said device is adjustable to an operational mode in which it is configured to record predefined information located on an information carrier, by imaging the predefined information with the aid of a plurality of images with partially overlapping contents.

33. A device according to claim 21, wherein said device is adjustable to an operational mode in which it is configured to image an object located at a distance from the device.

34. A device according to claim 21, further comprising a display for reproducing the handwritten information based on said description.

35. A device according to claim 21, wherein the imaging device comprises a controller, a light-sensitive sensor with a two-dimensional sensor surface for recording the images, and a light source, said controller selectively activating the light source to illuminate said surface while said light-sensitive sensor is being controlled to capture images of the thus-illuminated surface.

36. A device according to claim 35, wherein said controller selectively activates the light source to strobe at a predetermined frequency.

37. A device according to claim 21, wherein the image processor is configured to store said description in a memory.

38. A device according to claim 37, which is configured to selectively derive said description from the memory and operate a transceiver to transfer said description to an external device.

39. A device according to claim 38, wherein the transceiver is configured for wireless communication with the external device.

40. A device according to claim 21, further comprising a pen tip for generating permanent marks on said surface, said marks being undetectable to said imaging device.

41. A device according to claim 21, further comprising a pen tip for generating permanent marks on said surface, said device being configured to exclude said marks from said images.

42. A device according to claim 21, wherein said preexisting pattern includes graphics printed on the surface.

43. A device according to claim 21, wherein the imaging device comprises a lens system with automatic focus control.

44. A device according to claim 21, wherein the image processor is configured to evaluate every possible candidate shift between said pair of images.

45. A device according to claim 21, wherein the image processor is configured to evaluate, based on a plurality of element values for each image, different candidate shifts between said pair of images by:
   applying said candidate shifts to one image with respect to the other image in said pair of images;
   effecting, for each candidate shift, a comparison of each element value of said one image and an overlapping element value of said other image; and
   when the comparison fulfills a predetermined criterion, selectively updating a match rate value for the candidate shift.

46. A device according to claim 45, wherein the image processor is configured to determine said relative shift as the candidate shift that has an optimum match rate value.

* * * * *